July 20, 1948.  L. G. MAECHTLEN ET AL  2,445,358
PIPE JOINT
Filed June 2, 1945
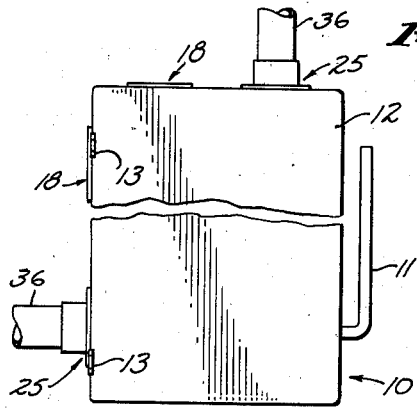
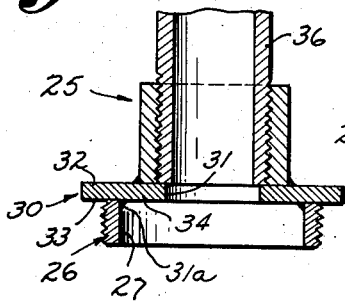
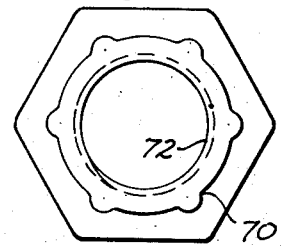
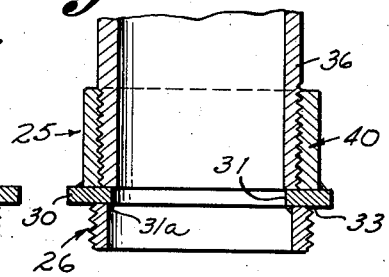
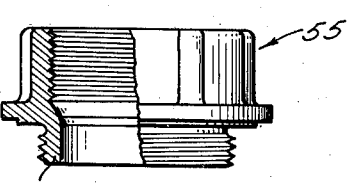
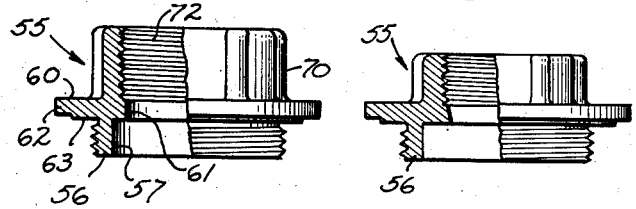
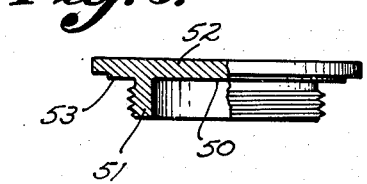
INVENTORS:
LAWRENCE G. MAECHTLEN
HAROLD A. DUVALL
CHARLES G. ESLER;
HARRIS, KIECH, FOSTER & HARRIS,
FOR THE FIRM
ATTORNEYS.

Patented July 20, 1948

2,445,358

UNITED STATES PATENT OFFICE 2,445,358

PIPE JOINT

Lawrence G. Maechtlen, San Marino, and Harold A. Duvall and Charles G. Esler, Los Angeles, Calif., assignors to Square D Company, Detroit, Mich., a corporation of Michigan Application June 2, 1945, Serial No. 597,278

1 Claim. (Cl. 285—48)

Our invention relates to the joining of conduits to a cabinet for electrical equipment in substantially fluid-tight relationship and, more particularly, to a novel connection member for this purpose.

Cabinets for electrical equipment, e. g., switches, controls, indicating means, etc., are conventionally made of sheet metal and provision must be made for attachment of one or more conduits for carrying electrical conductors into the interior of the cabinet. Often, the cabinet must be mounted in a position exposed to the elements and the junction of the conduit and the cabinet must be made raintight or substantially fluid-tight. It is an important object of the invention to provide a novel structure for accomplishing this.

It is often desirable to attach conduits of various sizes to a given-sized cabinet, but no inexpensive and simple way of accomplishing this has been devised. Instead, present practice is to install in the cabinet in the factory a hub of size to fit the conduit. The size of this hub cannot be increased to accommodate larger-sized conduits which may later be desired, and it is uneconomical to reduce the size by use of standard pipe fittings. As a consequence, the cabinet becomes, in effect, a single purpose enclosure and a distributor or dealer must stock a large variety of cabinets.

The present invention eliminates this exigency and permits the stocking of a limited number of multi-purpose cabinets by providing a novel connection member. In effect, a distributor or dealer is required to stock only a plurality of such connection members to accommodate different situations. It is an object of the invention to provide a novel interchangeable connection member for this purpose.

The attachment of a connection member or hub to a sheet metal cabinet for enclosing electrical equipment presents difficulties due to the thinness of the material of the cabinet. In making a substantially fluid-tight joint and in rigidifying the connection member with respect to the cabinet, the present invention provides, in its preferred embodiment, a threaded junction. Instead of mating the connection member to threads extending only through the thin sheet metal wall, the present invention comprehends the inward extrusion of a portion of the wall to form an inwardly-extending skirt internally threaded to receive the connection member. It is an object of the invention to provide such a structure.

Another object of the invention is to provide a plurality of such inwardly-extruded skirts in a cabinet for electrical equipment so that any of these can be selectively employed for attachment of the conduit. The invention includes among its objects a novel plug member or cap assembly for closing unused cabinet openings.

Other objects of the invention lie in the novel assembled connection member of the invention in which various sizes of connection member components can be assembled from a minimum number of stock parts.

Still further objects and advantages of the invention will be evident to those skilled in the art from the following description of an exemplary embodiment of the invention.

Referring to the drawing:

Fig. 1 is a utility view showing the face of a switch cabinet with two connected conduits, all remaining openings for possible receipt of conduits being closed;

Fig. 2 is an enlarged vertical sectional view of the upper right-hand corner of the switch cabinet shown in Fig. 1, showing at the top a connection member and, at the side, a plug member;

Fig. 3 is an enlarged view of a connection member for the same cabinet opening of Fig. 2 but providing for reception of a smaller conduit than shown in Fig. 2.

Fig. 4 illustrates a connection member for the same cabinet opening as in Fig. 2 but providing for reception of a larger conduit than shown in Fig. 2;

Fig. 5 is a top view of a one-piece die cast connection member for alternative use with the connection member of Fig. 2;

Fig. 6 is a vertical partly sectional view of the one-piece die cast connection member of Fig. 5;

Figs. 7 and 8 illustrate, respectively, one-piece die cast connection members for the same cabinet opening as the member of Fig. 5, but providing, respectively, for smaller and larger conduits; and Fig. 9 is a vertical partly sectional view of a one-piece die cast plug member for alternative use with the plug member of Fig. 2.

Referring particularly to Figs. 1 and 2, the invention is illustrated as applied to a cabinet 10 for electrical equipment, indicated as housing in a substantially fluid-tight manner an electrical switch actuated by an arm 11, this cabinet having the usual front cover 12 hinged as at 13. As shown, the cabinet is manufactured to provide four openings for prospective connection of the desired conduits, two of these being in the top wall and two being in the right-hand side wall. Any number and any positioning of such openings can be employed. One such opening in such of the top and side walls is shown in Fig. 2 and comprises a threaded opening 15 formed within an inwardly-extruded portion or skirt 16 of a sheet metal wall 17 of the cabinet. The inward extrusion is produced in the factory when manufacturing the cabinet by suitable inward drawing of the sheet metal wall 17 to form a peripherally continuous skirt, this skirt being then internally threaded. The threaded openings 15 are placed at convenient positions where entry of a conduit might be desirable, and the diameters thereof are larger than the largest-sized conduit which is to be connected to the cabinet.

In a preferred embodiment of our invention, each of the unused openings is closed by a removable plug or cap assembly 18 comprising a tubular neck 19 externally threaded to enter any of the openings 15 and brazed at its inner periphery to a circular cap member 20 which protrudes laterally beyond the tubular neck 19 to provide an annular shoulder 21 engaging the outer surface of the cabinet wall in substantially fluid-tight relationship. All of the openings 15 of the cabinet may be supplied with such closures when the cabinet is manufactured. During installation, the closures in openings nearest the desired conduit positioning are removed.

In any opening to which a conduit is to be connected, the electrician removes the cap assembly and replaces it with a connection member of selected size to fit the particular conduit. This connection member may be of the type shown in Figs. 2 to 4, inclusive, and is indicated generally by the numeral 25, Figs. 2, 3, and 4, showing connection members for various-sized conduits.

The connection members 25 of the invention are of the assembled type. Referring particularly to Fig. 3, for example, each connection member includes a tubular attachment member 26 externally threaded to provide an attachment portion which can be screwed into the existing threaded opening 15 of the inwardly-extruded skirt 16. This attachment member 26 provides a central opening 27, preferably slightly larger in diameter than the internal diameter of the largest conduit to be connected to the cabinet 10.

The connection member 25 includes, also, a flange or annular stop member 30 in the form of a flat, annular, washer-shaped member having an inner opening 31 and providing a circular or, if desired, a hexagonal periphery. The attachment member 26 is coaxially attached to the bottom of the stop member 30 by being brazed or welded thereto, as indicated by the numeral 31a. Such brazing or welding is preferably made completely around the inner periphery of the attachment member 26. The stop member 30 is designed to provide an outer portion 32 extending laterally beyond the attachment member 26 to form an outwardly-extending shoulder 33 for surface engagement with the external surface of the cabinet 10 in a zone around the threaded opening 15. The mating contact in this peripheral zone and the mating engagement between the internally-threaded skirt 16 and the externally-threaded attachment member 26 form a substantially fluid-tight connection. The stop member 30 also provides an inner portion 34 extending a distance into the opening 27 to provide a shoulder 35 adapted to engage the inner end of a conduit 36.

The connection member 25 includes also a collar member 40 secured coaxially to the upper surface of the stop member 30, as by welding or brazing, indicated by the numeral 41. Here again, the welding or brazing preferably extends completely around the outer periphery of the collar member 40 at its junction with the stop member 30 to provide a fluid-tight joint. The collar member 40 provides an opening 42 of a size to receive the conduit 36. While various means can be employed for attaching the conduit to the collar member, we prefer to use a threaded connection, the inner wall of the opening 42 being threaded to receive external threads on the end of the conduit 36 to form a substantially fluid-tight junction. The shoulder 35 of the stop member 30 extends into the opening 42 of the collar member 40 and provides an annular surface against which the end of the conduit 36 may seat.

In another preferred embodiment of our invention, each of the unused openings 15 is closed by a removable die cast plug 50 comprising in one piece a tubular neck 51 externally threaded to enter any of the openings 15, and a hexagonal cap member 52 which protrudes laterally beyond the tubular neck 51 to provide an annular shoulder 53 engaging the outer surface of the cabinet wall in substantially fluid-tight relationship. All of the openings 15 of the cabinet may be supplied with die cast closures, as described, or with the alternative assembled plug member 18, shown in Fig. 2, when the cabinet is manufactured. Identically with the alternative plug member in use, the closures in openings nearest the desired conduit positioning are removed during installation, and, when a plug member is removed, it is replaced with a connection member of selected size to fit the particular conduit.

The die cast connection member is of the type shown in Figs. 5 to 8, inclusive, and is indicated generally by the numeral 55, Figs. 6, 7, and 8 showing connection members for different sized conduits. Referring to Fig. 6, for example, each connection member includes a tubular attachment member 56 externally threaded to provide an attachment portion which can be screwed into the existing threaded opening 15 of the inwardly-extruded skirt 16. This attachment member 56 provides a central opening 57, preferably slightly larger in diameter than the internal diameter of the largest conduit to be connected to the cabinet 10.

The connection member 55 includes, coaxially aligned with the attachment member 56 and cast therewith, a hexagonal stop member or flange 60 in the form of a flat washer-shaped member having an inner opening 61. The stop member 60 is designed to provide an outer portion 62 extending laterally beyond the attachment member 56 to form an outwardly-extending shoulder 63 for surface engagement with the external surface of the cabinet 10 in a zone around the threaded opening 15. The mating contact in this peripheral zone and the mating engagement between the internally-threaded skirt 16 and the externally-threaded attachment member 56 form a substantially fluid-tight connection, identically as in the use of the assembled embodiment of our invention previously described.

The connection member 55 also includes, coaxially aligned with the members 56 and 60 and cast therewith, a collar member 70 which provides an opening 72 of a size to receive the conduit 36. While various means can be employed for attaching the conduit to the collar member, we prefer to use a threaded connection, the inner wall of the opening 72 being taper-threaded to receive tapered external threads on the end of the conduit 36 to form a substantially fluid-tight junction.

In manufacturing the cabinets 10, differing greatly in size, the openings 15 need be made of only two or three sizes to accommodate an extremely wide range of conduit sizes. In manufacturing the connection members 25 and 55, the attachment members 26 and 56 will always be of a size to fit the opening 15 in the particular cabinet, and the size of this opening will be larger than the largest-sized conduit to be connected. The number of various-sized openings 15 formed during the manufacture of the cabinets will be substantially less than the number of various-sized conduits available for connection. For each size of opening 15 the attachment members 26 or 56 will be manufactured with a variety of sizes of collar members 40 and 70 to accommodate the various sizes of conduits, e. g., $\frac{3}{4}''$, $1''$, $1\frac{1}{4}''$, etc. The diameter of the opening 31 or 61 of the stop member is desirably made slightly larger than the diameter of the conduit, while the outside dimension of this stop member remains constant with the size of the attachment member 26 or 56 to provide the annular shoulder 33 or 63. Thus, for example, Figs. 2 and 6 show the arrangement for an intermediate-sized conduit 36, while Figs. 4 and 8 indicate the difference in dimensions for larger-sized conduits, and Figs. 3 and 7 indicate the difference in dimensions for smaller-sized conduits. About eight various-sized connection members, either assembled or die cast, can be made to accommodate conduits of the various sizes necessary to carry 30 to 200-ampere conductors, with openings 15 ranging in size from $1\frac{3}{8}''$ to $2\frac{7}{16}''$. Correspondingly, the dealer or distributor need stock only these various-sized connection members and need not stock single-purpose cabinets.

Various changes and modifications can be made without departing from the spirit of the invention as defined in the appended claim.

We claim as our invention:

A connector for use with a cabinet housing electrical equipment which cabinet has wall means provided with internally threaded openings, said connector comprising a plate-like annular stop member, an externally threaded sleeve member, an internally threaded sleeve member, said sleeve members being coaxially arranged on opposite sides of said annular stop member concentric therewith, the edges of said annular stop member projecting inwardly and outwardly beyond both said sleeve members, said members being rigidly secured together in the said relationship.

LAWRENCE G. MAECHTLEN.
HAROLD A. DUVALL.
CHARLES G. ESLER.

REFERENCES CITED

The following references are of record in the file of this patent:

UNITED STATES PATENTS

| Number | Name | Date |
|---|---|---|
| 973,471 | Borgen | Oct. 25, 1910 |
| 1,000,108 | Mueller | Aug. 8, 1911 |

Certificate of Correction

Patent No. 2,445,358.  July 20, 1948.

LAWRENCE G. MAECHTLEN ET AL.

It is hereby certified that error appears in the printed specification of the above numbered patent requiring correction as follows: Column 3, line 3, for the word "such" read *each*; and that the said Letters Patent should be read with this correction therein that the same may conform to the record of the case in the Patent Office.

Signed and sealed this 9th day of November, A. D. 1948.

[SEAL]

THOMAS F. MURPHY,
*Assistant Commissioner of Patents.*